R. WALKER.
BRAKING MECHANISM FOR CYCLES AND THE LIKE.
APPLICATION FILED NOV. 21, 1908.
1,000,354.
Patented Aug. 8, 1911.
2 SHEETS—SHEET 1.
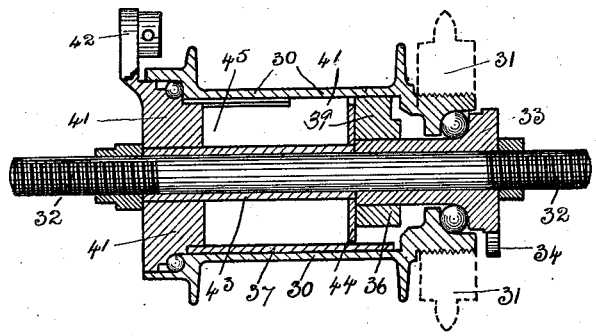
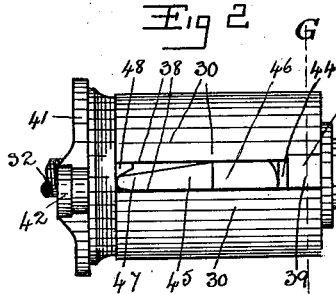
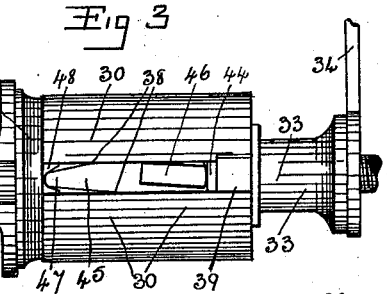
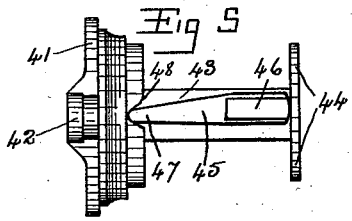
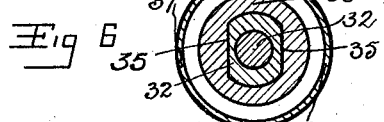
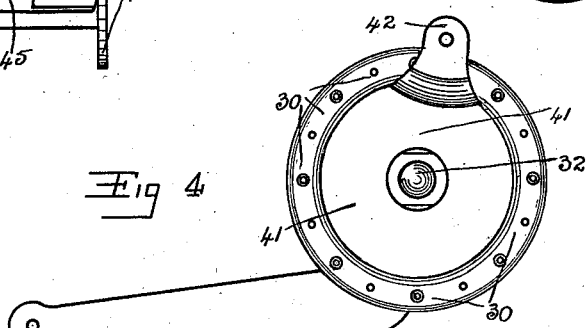
WITNESSES;
INVENTOR,
ROBERT WALKER,
by
Attorney.

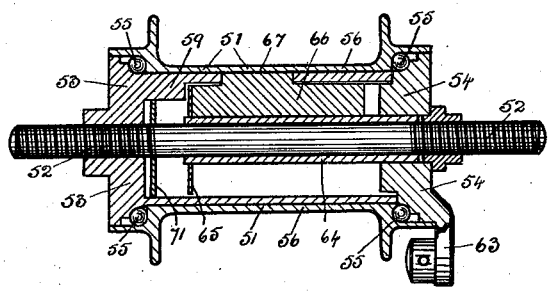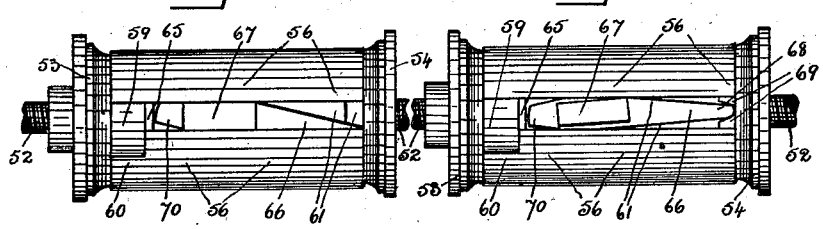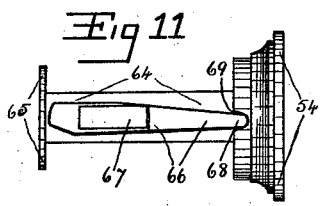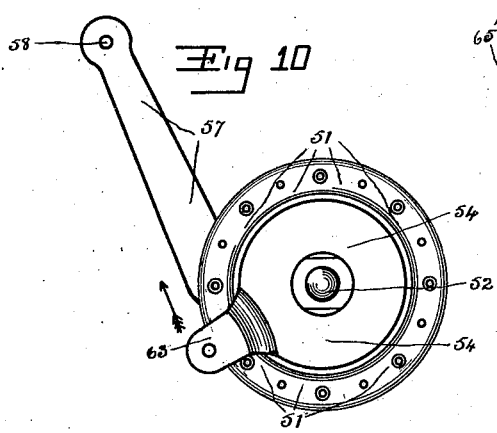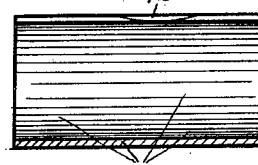

UNITED STATES PATENT OFFICE.

ROBERT WALKER, OF PLYMOUTH, ENGLAND.

BRAKING MECHANISM FOR CYCLES AND THE LIKE.

1,000,354. Specification of Letters Patent. Patented Aug. 8, 1911.

Original application filed November 20, 1907, Serial No. 403,005. Divided and this application filed November 21, 1908. Serial No. 463,918.

*To all whom it may concern:*

Be it known that I, ROBERT WALKER, a subject of the King of Great Britain, residing at Plymouth, in the county of Devon, England, have invented a new and useful Braking Mechanism for Cycles and the Like; and I do hereby declare the following to be a full, clear, and exact description of the same.

The present application is a division of my application, Serial No. 403,005, filed November 20, 1907, for Letters Patent of the United States.

My invention comprises improved mechanism arranged within the hub shell of cycles, motor cars, or the like, whereby said wheel may be braked.

The object of my invention is to provide a better and more efficient device for this purpose than those heretofore employed.

My invention consists in the employment of mechanism located within the wheel hub and comprising an expansible split cylinder and a longitudinally disposed lever for opening said cylinder to apply a braking pressure.

Referring to the drawings, Figure 1. is a longitudinal section of the hub of the rear wheel of a cycle fitted with braking mechanism according to my present invention. Fig. 2. illustrates the braking cylinder and lever in their off, or normal position, while, Fig. 3. is a similar view with the cylinder in its expanded or braking position. Fig. 4. is a left hand end elevation of a rear hub fitted with braking mechanism according to my invention. Fig. 5. shows the sleeve and operating lever with the brake cylinder removed, while Fig. 6. is a transverse section at G—H in Fig. 2. Fig. 7. is a longitudinal section through a front wheel hub of a cycle, provided with brake mechanism according to my invention. Fig. 8. shows the "braking" cylinder and operating lever removed from the hub shell and in their "off" or inoperative positions. Fig. 9. is a similar view to Fig. 8 but having the brake cylinder in its expanded or braking position. Fig. 10. is a right hand end elevation of the hub and braking mechanism. Fig. 11. illustrates ball race cup, and operating lever, with the brake cylinder removed, and Fig. 12. is a longitudinal section of the braking cylinder removed.

At Figs. 1 to 6 I have shown the application of my invention to the hub of a rear wheel of a cycle, wherein the shell 30 carries the usual sprocket 31 and spindle 32. On the right hand end of said spindle is a cone 33 anchored to the cycle frame by a lever 34 said cone having flat peripheral surfaces 35 whereon the key 36 is carried. Within the hub shell is a split cylinder 37 having a longitudinal slot 38; a lug 39 on the aforesaid key 36 engaging an opening 40 in said cylinder; thereby preventing rotation of the cylinder. At the opposite end of the hub is a cone 41 having an arm 42 which may be operated by any suitable cable or wire, thus giving a partial rotation of the cone 41. Said cone carries a sleeve 43 and flange 44 whereby the cylinder is supported. Lying upon this sleeve is a lever 45 having a cam projection 46 located within the slot 38 in the cylinder. One end 47 of said lever engages a recess 48 in the cone 41 thus twisting the cam projection and expanding the cylinder against the interior of the hub to give the desired braking effect, when the cone is rotated.

In applying my invention to the front hub of a cycle as illustrated upon the accompanying drawings at Figs. 7–12 I employ a hub shell 51 which may be of the usual form and size. Said hub shell is adapted to rotate around the stationary spindle 52; cones 53, 54, being provided at the ends between which and the hub shell are the usual antifriction balls 55.

The brake consists of a cylinder which is located within the hub shell and is split longitudinally to allow it to be expanded within said shell to give the desired braking effect. The left hand cup 53 is provided with a lever 57 which may be integral with said cup or may be made separate and secured thereto. Said lever 57 extends upwardly at substantially the same inclination as the front fork to which it is anchored by the hole 58 in any well known manner. On the inner face of said cup is a projecting lug 59 engaging an opening as 60 which may be an extension of the slot 61 in said cylinder 56; whereby rotation of said cylinder is prevented. The right hand cup 54 has an arm 63 which is controlled by any suitable cable or wire secured to a lever on the handle-bar or other part of the machine. Said cup 54 carries a sleeve 64 around the aforementioned axle 52, having on its far end a flange 65 which serves to support the cylinder 56. Lying on said sleeve 64 is a lever 66 having an oblong or equivalent cam projection 67 located within the slot 61 in the cylinder. One end 68 of said lever 66 enters a recess 69 in said cup; while the opposite end 70 of said lever is rounded to facilitate the twisting movement of the lever when the brake is operated. A washer 71 may be mounted on the spindle to retain the cylinder in its central position. If the arm 63 is raised by a cable in the direction indicated by the arrow in Fig. 10 then the cup 54 is partially rotated and with it the end 68 of said lever 66. The cam 67 is thus twisted in the cylinder slot 61, the cylinder being thus expanded within the hub shell against the interior of which it bears and thus gives the desired braking effect. Obviously the cylinder 56 tends to contract to its normal position and thus release the brake, release springs being thereby dispensed with. To prevent all possibility of the cylinder bulging where it is engaged by the cam it is hollowed at this point as 72 in Fig. 12 or the edge or edges may be beveled for the whole or part of its length.

What I claim then is—

1. In a braking mechanism, a spindle, a cone a lug attached to said cone, means for holding the cone against rotation, a second cone, means for rotating the second cone, a sleeve rigidly attached to the said second cone, and surrounding the spindle, a flange at the end of the sleeve opposite the said second cone, a lever supported by the sleeve and having at one end a cam projection and engaging at its other end the said second cone, a longitudinally slotted cylinder supported by the sleeve flange and provided with an opening engaging the lug, thereby preventing rotation of the cylinder, and adapted moveover, to have its slot engaged by the cam projection on the lever, in combination with a hub shell, substantially as set forth.

2. In a braking mechanism, a spindle, a cone provided with flat peripheral surfaces, means for holding said cone against rotation, means for rotating said second cone, a key fitting said flat surfaces and provided with a lug, a second cone, a sleeve rigidly attached to the said second cone and surrounding the spindle, a flange at the end of the sleeve opposite the said second cone, a lever supported by the sleeve and having at one end a cam projection and engaging at its other end the said second cone, a longitudinally slotted cylinder supported by the sleeve flange and provided with an opening engaging the key-lug, thereby preventing rotation of the cylinder, and adapted, moreover, to have its slot engaged by the cam projection on the lever, in combination with a hub shell, substantially as set forth.

In testimony whereof, I have signed my name to this specification in the presence of two subscribing witnesses.

ROBERT WALKER.

Witnesses:
   HAROLD J. C. FORRESTER,
   NORMAN S. BARLOW.

---

Copies of this patent may be obtained for five cents each, by addressing the "Commissioner of Patents, Washington, D. C."